3,215,645
PROCESS FOR PREPARING POLYURETHANE
FOAMS
Kenneth G. Flynn, Bridgeport, Conn., assignor to American Cyanamid Company, New York, N.Y., a corporation of Maine
No Drawing. Filed Aug. 23, 1961, Ser. No. 133,314
20 Claims. (Cl. 260—2.5)

This invention relates to novel foamable polyurethane compositions, to solid foams prepared therefrom, and to processes for producing such compositions and foams. More particularly, this invention relates to processes for the preparation of polyurethane foams wherein a small amount of a novel catalytic material is present in the foamable reaction mixture.

Rigid, semi-rigid and flexible solid foams derived from polyurethane resins have become important articles of commerce in recent years. In particular, polyurethane foams have been used in such diverse applications as in packaging, to cushion against impact shock, as thermal and acoustical insulating materials, in household cleaning devices such as floor and dish mops and the like, in mattresses, pillows and furniture cushions, and as interliners for clothing, to mention just a few.

Polyurethane foams are conventionally prepared by processes which employ reaction mixtures comprising a polyisocyanate, generally an organic diisocyanate such as a toluenediisocyanate, a reactive organic polyfunctional polyol, i.e., a polyol containing a plurality of hydroxyl groups which are reactive with isocyanate groups, such as a polyalkylene ether glycol, and either water, a blowing agent, or a mixture of water and blowing agent. In such processes, the polyisocyanate is reacted with the polyol, thereby causing chain growth and resulting in an isocyanate-modified polyol, or polyurethane, which contains both unreacted isocyanate groups and urethane linkages having hydrogen atoms available for cross-linking with unreacted isocyanate groups. The unreacted isocyanate groups of the isocyanate-modified polyol, together with those of any unreacted polyisocyanate present in the reaction mixture, may in turn be reacted with water, which results not only in chain extension but also in the formation of carbon dioxide gas which is trapped in the fairly viscous liquid reaction mixture, or the process may be carried out using a suitable blowing agent, e.g., an inert liquid which vaporizes at reaction temperature, either of which causes foaming and expansion of the polyurethane to a porous or cellular solid structure. Thus, the polyisocyanate component of the reaction mixture can perform a three-fold function, namely, to extend the polyol chain, to cross-link or cure the chain-extended material, and to react with any water present to liberate carbon dioxide, which expands the reaction mixture.

In certain instances, this multiple reactivity of the polyisocyanate component, together with the exothermic nature and quite rapid rate of certain of the aforementioned reactions, e.g., the reaction of free isocyanate groups with water, can lead to serious difficulties with respect to both the rate at which the reaction mixture foams and the characteristics of the foamed product itself. For example, formation of carbon dioxide must not occur either too early or too late in the course of the overall reaction since, on the one hand, the reaction mixture at an early stage in the reaction will ordinarily not be sufficiently viscous to prevent the gas from escaping, with attendant increase in density or total collapse of the foamed structure, while on the other hand, the reaction mixture at a late stage in the reaction will usually be so viscous that large amounts of gas evolving at this point would tend to cause internal or surface fissures and voids in the foam.

Of the many expedients proposed by those skilled in the art for achieving desirable characteristics in polyurethane foams, regulation of the reaction rates of the foamable mixtures by the use of catalysts, and particularly tertiary amine catalysts, is perhaps the most common. In almost every case, however, the materials which have heretofore been proposed for use as catalysts in polyurethane foamable compositions evidence at least one undesirable characteristic which detracts from their overall usefulness. As a case in point, many of the known tertiary amine catalysts are volatile liquids, and are readily driven from the reaction mixture by the heat generated in the exothermic reactions taking place therein. Other prior art tertiary amine catalysts which, although they are solids, have relatively low vapor pressures, may produce many harmful effects in the foamed product. For example, certain tertiary amines of this type impart obnoxious odors to the finished foam, while others act as solvents, and will dissolve or otherwise affect coating compositions or other materials which may come in contact with the finished foam. Thus, the art is continually searching for new catalysts for use in the preparation of polyurethane foams which will give the required regulation of the reaction rate of the foamable mixture and yet avoid the aforementioned undesirable features inherent in prior art catalysts.

To these ends, the present invention relates to the discovery that certain hepta-substituted biguanides, e.g., 1,1,2,4,4,5,5-heptamethylbiguanide, are excellent catalysts for the preparation of polyurethane foams and have numerous advantages over other prior art catalytic materials, not only with respect to reactivity but also in that they exhibit a number of other highly desirable properties, such as low volatility, high thermal stability, and high basicity per unit weight, which make them more effective than any other catalyst known for this purpose. Due to these properties, they may be used in smaller amounts than most, if not all, of the known prior art polyurethane catalysts. Furthermore, their use results in a faster cure of the foamable mixture, minimizes the time and temperature required for any after-cure, and enables the production of polyurethane foams which are uncontaminated by thermal dissociation products.

It is, therefore, an object of my invention to provide novel foamable polyurethane compositions.

It is also an object of my invention to provide novel foamable polyurethane compositions containing 1,1,2,4,4,5,5-hepta-substituted biguanide catalysts.

A further object of my invention is to provide improved processes for the preparation of solid polyurethane foams.

These and other objects of my invention will be discussed more fully hereinbelow.

For the sake of simplicity, the present invention will be described chiefly in terms of 1,1,2,4,4,5,5-heptamethylbiguanide, a representative species of the broad class of hepta-substituted biguanides which I have found to be useful as polyurethane foam catalysts. Nevertheless, the invention should not be considered as being limited to this one species, inasmuch as any of the broad class of 1,1,2,4,4,5,5-hepta-substituted biguanides represented by the general formula:

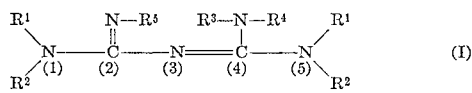

wherein $R^1$, $R^2$, $R^3$ and $R^4$ each represent an alkyl group having from 1 to 18 carbon atoms, inclusive, such as methyl, ethyl, propyl, isopropyl, n-butyl, sec-butyl, t-butyl, amyl, hexyl, octyl, decyl, dodecyl, octadecyl, and the like, or an aryl group, such as phenyl, tolyl, xylyl, benzyl, α-naphthyl, β-naphthyl, and the like, and $R^5$ represents a lower alkyl group, e.g., methyl, ethyl, propyl, and the like, may be employed singly or in combination with one another in the practice of the present invention.

An illustrative but by no means exhaustive listing of 1,1,2,4,4,5,5-hepta-substituted biguanides coming within the scope of the general formula set forth above includes:

1,1,2,4,4,5,5-heptamethylbiguanide,
1,1,2,4,4,5,5-heptaethylbiguanide,
1,1,2,4,4,5,5-heptapropylbiguanide,
1,1,4,4,5,5-hexamethyl-2-ethylbiguanide,
1,1,4,4,5,5-hexaethyl-2-methylbiguanide,
1,1,2,4,5,5-hexamethyl-4-phenylbiguanide,
1,1,2,5,5-pentamethyl-4,4-diethylbiguanide,
1,1,2,5,5-pentamethyl-4,4-dipropylbiguanide,
1,1,2,5,5-pentamethyl-4,4-diphenylbiguanide,
1,1,2,5,5-pentaethyl-4,4-dimethylbiguanide,
1,1,2,5,5-pentaethyl-4,4-dipropylbiguanide,
1,1,2,5,5-pentamethyl-4-ethyl-4-propylbiguanide,
1,1,2,5,5-pentamethyl-4-ethyl-4-hexylbiguanide,
1,2,4,5,5-pentamethyl-1,4-diethylbiguanide,
1,2,4,5,5-pentamethyl-1,4-di-t-butylbiguanide,
1,2,4,5-tetramethyl-1,5-diethyl-4-phenylbiguanide,
1,4,4,5-tetramethyl-1,2,5-triethylbiguanide,
1,2,4,5-tetraethyl-1,5-dimethyl-4-propylbiguanide, and the like.

These 1,1,2,4,4,5,5-hepta-substituted biguanides can be prepared by any of several sequences of reaction steps, all of which involve the use of readily obtainable intermediates. In one such reaction sequence the first of these intermediates is a 1,1,3,3-tetra-substituted guanylchloroformamidine hydrochloride represented by the general formula:

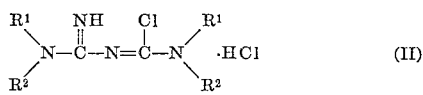

wherein $R^1$ and $R^2$ are as described for Formula I above, e.g., 1,1,3,3-tetramethylguanylchloroformamidine hydrochloride. These tetra-substituted intermediates can be prepared by a number of suitable methods.

One such method involves first preparing a disubstituted cyanamide dihydrochloride represented by the general formula:

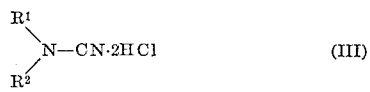

e.g., dimethylcyanamide dihyrochloride, by reacting 1 mol equivalent of the corresponding disubstituted cyanamide with 2 mol equivalents of hydrogen chloride at a temperature of from about 0° C. to about 15° C., and then heating the thus-produced disubstituted cyanamide dihydrochloride above its melting point, i.e., at a temperature of from about 120° C. to about 160° C., to produce the corresponding 1,1,3,3-tetra-substituted guanylchloroformamidine hydrochloride.

A second method of preparing the tetra-substituted intermediate involves reacting together the aforementioned disubstituted cyanamide and disubstituted cyanamide dihydrochloride on a mol-for-mol basis at a temperature within the range of from about 40° C. to about 140° C.

Another simple and convenient method of preparing a 1,1,3,3-tetra-substituted guanylchloroformamidine hydrochloride consists of reacting the corresponding disubsttuted cyanamide and hydrogen chloride in equimolar proportions, either alone or in the presence of a suitable solvent or diluent, such as acetonitrile, dioxane, tetrahydrofuran, benzene, toluene, chlorobenzene, chloroform, and the like, at a temperature within the range of from about 30° to about 180° C., and preferably within the range of from about 60° C. to about 150° C. Obviously, this method eliminates the additional step of first forming the disubstituted cyanamide dihydrochloride intermediate.

The 1,1,3,3-tetra-substituted guanylchloroformamidine hydrochloride intermediate obtained by these or any other suitable methods is in turn reacted with a secondary amine having the general formula:

wherein $R^3$ and $R^4$ are as described for Formula I above, e.g., dimethylamine, to produce the corresponding 1,1,4,4,5,5-hexa-substituted biguanide hydrochloride represented by the general formula:

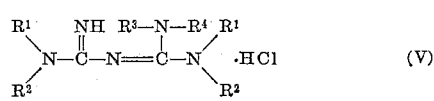

e.g. 1,1,4,4,5,5-hexamethylbiguanide hydrochloride. The optimum reaction temperatures employed in this reaction vary somewhat with the specific reactants, but in general temperatures ranging from about 5° C. to about 90° C. are preferred. It is also preferred that the reaction be carried out in the presence of a solvent, such as acetonitrile, dioxane, tetrahydrofuran, benzene, toluene, water, or a lower aliphatic monohydric alcohol, e.g., methanol, ethanol, propanol, butanol, and the like.

The final steps in this reaction sequence involve first forming the free base from the corresponding 1,1,4,4,5,5-hexa-substituted biguanide hydrochloride, e.g., by contacting said hydrochloride with an alkali metal hydroxide, such as sodium hydroxide. The free base, e.g., 1,1,4,4,5,5-hexamethylbiguanide, is then reacted with a disubstituted sulfate having the general formula:

wherein $R^5$ is as described for Formula I above, e.g., dimethyl sulfate, in the presence of a suitable solvent, e.g., benzene, toluene, xylene, chlorobenzene, and the like, at a temperature ranging from about −25° C. to about 50° C., followed by the addition of an aqueous solution of an alkali metal hydroxide, such as sodium hydroxide, to destroy excess dimethyl sulfate and liberate the resulting free base, i.e., the corresponding hepta-substituted derivative, e.g., 1,1,2,4,4,5,5-heptamethylbiguanide.

A wide variety of reactive organic polyfunctional polyols are commonly employed in preparing polyurethane foams. Among the polyols most widely used for this purpose are the polyalkylene ether, thioether, and ether-thioether glycols represented by the general formula:

$$HO-(RX)_n-H$$

wherein R represents the same or different alkylene radicals, generally ones which contain up to about 10 carbon atoms, X represents oxygen or sulfur, and $n$ is an integer large enough so that the molecular weight of the polyalkylene ether, thioether, or ether-thioether glycol is at least about 500, e.g., from about 500 to about 10,000. The polyalkylene ether glycols included within this general formula, such as polyethylene glycols, polypropylene glycols, polybutylene glycols, polytetramethylene glycols, polyhexamethylene glycols, and the like, which are obtained, for example, by acid-catalyzed condensation of the corresponding monomeric glycols or by the condensation of lower alkylene oxides, such as ethylene oxide, propylene oxide, and the like, either with themselves or with glycols such as ethylene glycol, propylene glycol, and the like, are preferred.

Polyalkylenearylene ether, thioether and ether-thioether glycols which also have molecular weights ranging from about 500 to about 10,000 but which differ from the above-described polyalkylene glycols in having arylene radicals, such as phenylene, naphthylene and anthrylene radicals, either unsubstituted or substituted, e.g., with alkyl or aryl groups, and the like, in place of some of the alkylene radicals of said polyalkylene glycols may also be employed as polyol reactants. Polyalkylenearylene glycols of the type ordinarily used for this purpose will usually contain at least one alkylene-ether radical having a molecular weight of about 500 for each arylene radical present.

Essentially linear polyesters containing a plurality of isocyanate-reactive hydroxyl groups constitute another class of reactive organic polyfunctional polyols which may be employed in preparing polyurethane foams according to the practice of the present invention. While the preparation of polyesters suitable for this purpose has been described in great detail in the prior art, and forms no part of the present invention per se, it may be mentioned here by way of illustration that polyesters of this type may be prepared by the condensation of a polyhydric alcohol, generally a saturated aliphatic diol such as ethylene glycol, propanediol-1,2, propanediol-1,3, butanediol-1,3, butanediol-1,4, pentanediol-1,2, pentanediol-1,5, hexanediol-1,3, hexanediol-1,6, diethylene glycol, dipropylene glycol, triethylene glycol, tetraethylene glycol, and the like, as well as mixtures of such diols with each other and with minor amounts of polyols having more than two hydroxyl groups, preferably saturated aliphatic polyols such as glycerol, trimethylol ethane, trimethylol propane, pentaerythritol, sorbitol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, sebacic, malic, phthalic, cyclohexanedicarboxylic, and endomethylenetetrahydrophthalic acids, and the like and their isomers, homologs, and other substituted derivatives, e.g., chloro-derivatives, or with mixtures of such acids with each other and with unsaturated dicarboxylic acids or anhydrides such as maleic, fumaric, citraconic, and itaconic acids, and the like, as well as with polycarboxylic acids containing three or more carboxyl groups, such as aconitic acid and the like.

The essentially linear polyesters commonly used in preparing polyurethane foams preferably have molecular weights ranging from about 750 to about 3,000. In addition, they will generally have relatively low acid numbers, e.g., acid numbers not appreciably in excess of about 60 and preferably as low as can be practicably obtained, e.g., 2 or less. Correspondingly, they will generally have relatively high hydroxyl numbers, e.g., from about 30 to about 700, with polyesters having hydroxyl numbers ranging from about 30 to about 70 usually being preferred for the preparation of flexible foams and those having hydroxyl numbers ranging from about 200 to about 700 usually being preferred for the preparation of more rigid foams. When preparing these polyesters, an excess of polyol over polycarboxylic acid is generally used to insure that the resulting essentially linear polyester chains contain a sufficient amount of reactive hydroxyl groups.

Another class of suitable organic polyfunctional polyol reactants includes polyalkylene ether polyols containing more than two reactive hydroxyl groups, such as polyalkylene ether triols, tetrols, and the like, which are prepared, for example, by reacting polyols such as glycerol, trimethylol ethane, trimethylol propane, pentaerythritol, dipentaerythritol, sorbitol, and the like, with lower alkylene oxides such as ethylene oxide, propylene oxide, and the like.

Nitrogen-containing polyfunctional polyols may also be used as polyol reactants. Among such materials there are included the polyesteramides conventionally employed in the preparation of polyurethane foams, i.e., those having molecular weights ranging from about 750 to about 3,000, acid numbers ranging from about 60 as a maximum to as low as can be practicably obtained, e.g., 2 or less, and hydroxyl numbers ranging from about 30 to about 700, and also high molecular weight polyamino alcohols, such as hydroxypropylated alkylene diamines of the general formula:

$$(HOH_6C_3)_2N-R-N(C_3H_6OH)_2$$

wherein R represents an alkylene radical having from 2 to 6 carbon atoms, inclusive, of which N,N,N',N'-tetrakis(2-hydroxypropyl)-ethylenediamine is a representative species, as well as higher analogs thereof, such as hydroxypropylated polyalkylenepolyamines of the general formula:

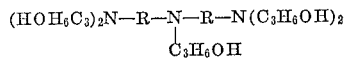

wherein R is as defined hereinabove (see U.S. Patent No. 2,697,118 to Lundsted et al.).

As can be readily appreciated, mixtures of the various reactive organic polyfunctional polyols described hereinabove may also be employed in preparing polyurethane foams according to the practice of the present invention.

Just as in the case of the polyol reactants, polyurethane foams may be prepared using a wide variety of organic polyisocyanates, among which there are included aromatic diisocyanates, such as m-phenylenediisocyanate, p-phenylenediisocyanate, 4-t-butyl - m - phenylenediisocyanate, 4-methoxy-m-phenylenediisocyanate, 4-phenoxy-m-phenylenediisocyanate, 4-chloro-m-phenylenediisocyanate, toluenediisocyanates (either as a mixture of isomers, e.g., the commercially available mixture of 80% 2,4-toluenediisocyanate and 20% 2,6-toluenediisocyanate, or as the individual isomers themselves), m-xylylenediisocyanate, p-xylylenediisocyanate, cumene-2,4-diisocyanate, durenediisocyanate, 1,4-naphthylenediisocyanate, 1,5-naphthylenediisocyanate, 1,8-naphthylenediisocyanate, 2,6-naphthylenediisocyanate, 1,5 - tetrahydronaphthylenediisocyanate, p,p'-diphenyldiisocyanate, diphenylmethane - 4,4'-diisocyanate, 2,4-diphenylhexane - 1,6 - diisocyanate, "bitolylenediisocyanate" (3,3'-dimethyl-4,4' - biphenylenediisocyanate), "dianisidinediisocyanate" (3,3' - dimethoxy-4,4'-biphenylenediisocyanate), and polymethylenepolyisocyanates represented by the general formula:

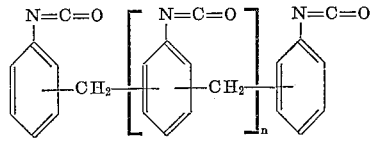

wherein $n$ represents an integer between 0 and about 5, and the like; aliphatic diisocyanates, such as methylenediisocyanate, ethylenediisocyanate, the tri-, tetra-, penta-, hexa-, octa, nona and decamethylene-ω,-ω-diisocyanates, 2-chlorotrimethylenediisocyanate, 2,3-dimethyltetramethylenediisocyanate, and the like, and tri- and higher isocyanates, such as benzene-1,3,5-triisocyanate, toluene-2, 4,6-triisocyanate, diphenyl-2,4,4'-triisocyanate, triphenylmethane-4,4',4"-triisocyanate, and the like. Mixtures of two or more of such organic polyisocyanates may also be employed.

The 1,1,2,4,4,5,5-hepta-substituted biguanides of the present invention can be employed as catalysts in any of the methods described in the prior art for the preparation of polyurethane foams. In general, these methods may be classified as either "one-shot" or "pre-polymer" techniques.

Numerous variations are practiced in preparing "one-shot" polyurethane foams. For example, all of the components of the foamable mixture, i.e., the reactive organic polyfunctional polyol, the organic polyisocyanate, water or other agent which will cause gas formation, and the hepta-substituted biguanide catalyst, alone or together with other conventionally employed materials, such as co-catalysts, surface-active emulsifying agents, and the like, can be charged simultaneously to a suitable mixing device, blended together therein, and then charged to the mold where foaming will take place. The temperature at which mixing and foaming take place are not critical, and may range from about room temperature, i.e., about 25° C., to about 60° C. Ordinarily, the heat generated by the exothermic reactions taking place in the reaction mixture will be sufficient to solidify the foamed mass. "One-shot" polyurethane foams may also be prepared by first preparing separate blends of two or more of the components of the foamable mixture, e.g., a blend containing the polyol and catalyst and another containing the emulsifying and gas-generating agents, and then either premixing these blends before adding the polyisocyanate or adding each of them, together with the polyisocyanate, to the mixer. In addition, a blend of all of the components except the polyisocyanate may be prepared and then added to the mixer prior to the addition of the polyisocyanate.

The "pre-polymer" technique, as commonly practiced, involves first of all mixing polyol and polyisocyanate under substantially anhydrous conditions, i.e., with usually not more than about 0.2% by weight of water, based on the total weight of the mixture, being present, and with a molar excess of the polyisocyanate over the polyol usually being employed, reacting this mixture at a temperature ranging from about room temperature to about 100° C. for from about 20 minutes to about 8 hours, and then cooling the resulting "pre-polymer" to a temperature of from about room temperature to about 60° C. The "pre-polymer" is then mixed with additional polyol, together with the gas-generating agent, the catalyst and, if desired, any of the other ingredients commonly employed in the preparation of polyurethane foams by the "pre-polymer" technique, e.g., co-catalysts, surface-active emulsifying agents, and the like, and transferred to a suitable mold. Here too, the temperatures at which mixing and foaming are accomplished are not critical, and may range from about room temperature to about 60° C.

In any of the prior art techniques for preparing polyurethane foams, mixing of all the components prior to transferring the reaction mixture to a mold is usually accomplished by high speed stirring in a suitable mixing device for relatively short periods of time after the last reactant, usually the polyisocyanate, has been introduced. Furthermore, while carrying out any of these techniques using the catalysts of the present invention, particulate or fibrous fillers, such as chopped α-cellulose, asbestos or glass fibers, and the like, conventional fire-retarding additives, for example phosphates such as triphenyl phosphate, tricresyl phosphate, tris (2,3-dibromopropyl) phosphate, tris (β-chloroethyl) phosphate, and the like, dyes or pigments, e.g., silica pigments, stabilizers, and the like may be added to the polyurethane reaction mixture at any time prior to the actual foaming thereof, preferably at the time when all the other components are being mixed together.

The solid polyurethane foams prepared as described hereinabove may, if desired, be subjected to a short after-curing treatment once they have been removed from the mold in order to increase their degree of cure or cross-linking, although this will not be necessary in all cases. After-curing, when practiced, will preferably be accomplished by heating the foams in an atmosphere having a relative humidity of from about 25% to about 75% at a temperature of from about 25° C. to about 50° C. for from about 60 minutes to about 24 hours.

When preparing polyurethane foams according to the practice of the present invention, the stoichiometry of the system normally will be such that the ratio of total isocyanate equivalents to total active hydrogen equivalents (hydroxyl groups from the reaction organic polyfunctional polyol plus water, when present) will be close to one, e.g., from about 0.9:1 to about 1.1:1, respectively. Similarly, if water is employed as the gas-generating agent, the amount present in the foamable composition can be varied from about 50% to several hundred percent of the theoretical amount required, said theoretical amount being 0.5 mol per mol of free isocyanate groups present in the reaction mixture. Thus, amounts of water ranging from about 0.25 mol to about 1.5 mols per mol of free isocyanate groups may be employed.

Modifications and changes which may be made in conventional polyurethane reaction mixtures to provide foams having various degrees of flexibility and rigidity are so well known in the art that no more than a brief mention of some of them need be made here. Thus, in addition to those previously indicated, i.e., using essentially linear polyesters and polyesteramides having certain specified molecular weights, acid numbers and hydroxyl numbers and varying the mol ratio of polyisocyanate to polyol, numerous other modifications, such as using tri- or higher functional monomeric polyols or polycarboxylic acids in preparing the polyol reactant, using tri- or higher functional polyisocyanates, and the like, have been disclosed in the prior art to the accomplishment of these ends. It is contemplated that any or all of these modifications, together with any other manipulative steps described in prior art processes for the preparation of solid resin foams, may be appropriated to the practice of the present invention.

My 1,1,2,4,4,5,5-hepta-substituted biguanide catalysts will be used in amounts ranging from about 0.05% to about 1.0% by weight, based on the total weight of the foamable composition, and preferably in amounts ranging from about 0.1% to about 0.3% by weight on the above-stated basis. In certain instances, amounts of co-catalysts ranging from about 0.05% to about 1.0% by weight, based on the total weight of the foamable composition, may be employed together with the hepta-substituted biguanides. A particularly suitable class of co-catalysts, especially where flexible foams are being prepared, includes tin salts and hydrocarbon-substituted tin salts of higher aliphatic monocarboxylic acids, such as stannous octoate, stannous laurate, dibutyltin di-2-ethylhexoate, dibutyltin dilaurate, and the like.

The addition of a surface-active emulsifying agent to the polyurethane reaction mixture chiefly serves to insure complete dispersion of the various components, and particularly the catalyst and water or other gas-generating agent, during the relatively short mixing cycle. The degree of dispersion obtained influences, to a certain extent, both the structure of the cells formed in the foam, i.e., the ratio of open to close cells, and the size of these cells. However, the presence of an emulsifying agent is not always essential to the preparation of acceptable foams. Any of the well-known anionic, cationic or nonionic surface-active emulsifying agents, wetting agents and detergents may be employed in the practice of the present invention. Representative of these surface-active agents are such materials as lower alkylene oxide condensation products with higher aliphatic fatty acids and alcohols, such as polyoxyethylene sorbitan monopalmitate, polyoxyethylene sorbitan monostearate, polyethylene glycol ricinoleate, and the like; polyglyceride esters of fatty acids and blends thereof with oil-soluble sulfonates, and water-soluble organosilicone polymers, such as polydimethylsiloxanes, silicone-glycol copolymers, and the like. The amount of emulsifying agent employed in any particular case can be varied to a considerable extent depending on a number of factors, such as, for example, the nature of the emulsifying agent itself, but in general it can be stated that conventional emulsifying agents will usually be employed in amounts ranging from about 0.1% to about 5.0% by weight, based on the total weight of the foamable composition.

As indicated hereinabove, carbon dioxide gas, generated by the reaction of water with free isocyanate groups present in the polyurethane reaction mixture, can be used to expand the reaction mixture to an acceptable foamed product. However, as also indicated above, it may be desirable, in certain instances, to utilize other gas-generating materials, either in addition to or instead of water, to expand the reaction mixture. Various materials of this type are so well known in the art that it is only necessary to mention in passing that among the most suitable, especially where rigid foams are being prepared, are inert liquids such as halogenated saturated hydrocarbons, e.g., halogenated saturated aliphatic hydrocarbons such as trichloromonofluoromethane, monochlorodifluoromethane, dichlorodifluoromethane, trichlorotrifluoroethane, dichlorotetrafluoroethane, and the like, which have boiling points such that they will vaporize under reaction conditions to produce gases which supplement the action of the carbon dioxide. The amount of inert liquid used may, of course, be varied over a wide range, depending on such factors as the nature of the liquid itself, the density desired in the finished foam, etc., but in general amounts of inert liquid ranging from about 1.0% to about 15.0% by weight, based on the total weight of the foamable composition, will be used.

There are several ways of determining the catalytic activity of materials proposed for use as catalysts in the preparation of polyurethane foams. One common method involves first measuring the rate of the uncatalyzed reaction between an isocyanate and an alcohol in a solvent and then measuring the rate of reaction between the same reactants in the same solvent in the presence of the particular catalytic material being evaluated, i.e.,

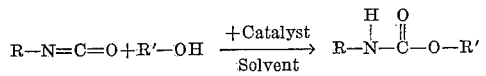

The catalytic activity of the particular material being evaluated is determined by comparing the second-order rate constant observed for the uncatalyzed reaction ($k_o$) with the second-order rate constant observed for the catalyzed reaction ($k_{bi}$). The relationship between these rate constants and catalyst concentration may be expressed as:

$$k_c = \frac{k_{bi} - k_o}{\text{catalyst concentration}}$$

$k_c$ being the corrected catalyst rate constant. Thus, a measure of the relative catalytic activities of any number of potential catalytic materials can be obtained by repeating this procedure for each of the materials in question and comparing the values of $k_c$ determined in each case.

The above-described method was used to demonstrate the outstanding catalytic activity of 1,1,2,4,4,5,5-heptamethylbiguanide by comparing its behavior with that of three partially methylated biguanides and three commercially available polyurethane foam catalysts in the reaction:

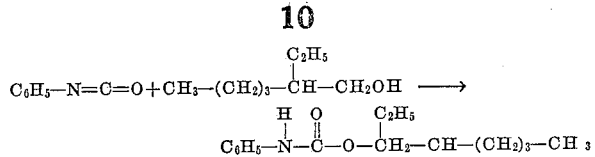

In each case, 0.08 mol of phenyl isocyanate, 0.08 mol of 2-ethylhexan-1-ol and 2.0 mol percent of the particular catalyst being evaluated were reacted in benzene at 25° C. until the presence of the isocyanate could no longer be detected. The reaction was also carried out in the same manner but in the absence of any catalyst in order to provide the necessary value of $k_o$. The results of this comparison are listed in the following table.

TABLE I

| Catalyst [1] | $k_{bi}$ [2] | $k_c$ |
| --- | --- | --- |
| 1,1,2,4,4,5,5-heptamethylbiguanide | 105 | 75,000 |
| 1,1,4,4,5,5-hexamethylbiguanide | 2.0 | 1,220 |
| 1,1,4,5,5-pentamethylbiguanide | 0.5-1.0 | 355.0-630.0 |
| 1,1,5,5-tetramethylbiguanide | 1.6-2.0 | 1,030-1,320 |
| Tetramethylguanidine | 4.0 | 2,740 |
| Triethylenediamine | 7.8-8.0 | 5,580-5,710 |
| Triethylamine | 0.95 | 680 |

[1] $k_o$ (uncatalyzed reaction)=0.16.
[2] In liters/mol-hour.

Of course, the most obvious method of determining the catalytic activity of potential catalytic materials is to observe their behavior in actual polyurethane foam formulations, and to this end, and also in order that those skilled in the art may more fully appreciate the inventive concept presented herein, the following examples are set forth. However, these examples are given solely by way of illustration and should not be considered as expressing limitations unless so set forth in the appended claims. All parts and percentages are by weight, unless otherwise stated.

Examples I-XV illustrate the preparation of rigid foams using the pre-polymer technique.

*Example I*

A mixture designated as Component A was prepared by charging 37.5 parts of a commercially available sorbitol-based polyether having a molecular weight of 760 and a hydroxyl number of 490, 12.5 parts of trichloromonofluoromethane, 0.5 part of a commercially available water-soluble organo-silicone copolymer surfactant (Silicone L-520), a polysiloxane-polyalkylene block copolymer prepared in accordance with the disclosure of U.S. Patent No. 2,834,784, and 0.25 part of 1,1,2,4,4,5,5-heptamethylbiguanide to a suitable container equipped with stirring means and stirring the charge until it became substantially homogeneous.

The pre-polymer (Component B) employed was a commercially available toluenediisocyanate-polyol pre-polymer (IPE 2A) having a free isocyanate content of 28.5%.

Component A was added to 50 parts of Component B contained in a suitable reaction vessel equipped with stirring means. The resulting reaction mixture was stirred at room temperature for 15 seconds at 1700-1900 r.p.m. and then immediately poured into a square, open-topped, 6" x 6" x 4" cardboard mold and allowed to foam. After the foam had risen to its maximum height it was retained in the mold until its upper surface was tack-free, at which point it was then removed from the mold and cured in a controlled humidity oven (50% relative humidity) for 24 hours at 73° F.

*Examples II-XV*

Fourteen foam samples were prepared in the manner described in Example I above, the sole variation in the procedure given therein being that the catalyst present in Component A was varied as described in Table II below.

Various physical properties measured for each of the foams of Examples I–XV are also given in Table II.

TABLE II

| Example | Catalyst | Catalyst Concentration [6] | Rise Time [7] | Tack-Free Time [7] | Foam Density [8] | Compressive Strength [9] | Compressive Strength/ Density |
|---|---|---|---|---|---|---|---|
| I | HpMBG [1] | 0.25 | 0.7 | 0.8 | 2.79 | 67.4 | 24.2 |
| II | HpMBG | 0.20 | 1.5 | 1.5 | 2.47 | 58.2 | 23.6 |
| III | HpMBG | 0.15 | 2.0 | 3.5 | 2.41 | 56.7 | 23.5 |
| IV | HpMBG | 0.10 | 3.5 | 11.0 | 2.40 | 41.6 | 17.3 |
| V | TMBDA [2] | 0.3 | 7.0 | 9.0 | 2.73 | 42.8 | 15.7 |
| VI | TMBDA | 0.7 | 4.5 | 4.0 | 2.30 | 41.9 | 18.2 |
| VII | TMBDA | 0.9 | 4.0 | 2.0 | 2.51 | 48.9 | 19.5 |
| VIII | TMG [3] | 0.3 | 5.0 | 7.0 | 2.61 | 43.9 | 16.8 |
| IX | TMG | 0.6 | 3.5 | 3.0 | 2.62 | 51.9 | 19.8 |
| X | TMG | 0.7 | 3.5 | 3.0 | 2.46 | 51.9 | 21.1 |
| XI | TED [4] | 0.3 | 4.5 | 2.0 | 2.9 | 53.8 | 18.6 |
| XII | TED | 0.5 | 2.5 | 1.5 | 2.7 | 43.1 | 16.0 |
| XIII | TED | 0.85 | 1.0 | 1.0 | 2.7 | 61.3 | 22.7 |
| XIV | TMP [5] | 0.3 | [10] 15.0 | | | | |
| XV | TMP | 0.8 | [10] 10.0 | | | | |

[1] HpMBG = 1, 1, 2, 4, 4, 5, 5—heptamethylbiguanide.
[2] TMBDA = N, N, N', N'—tetramethylbutanediamine.
[3] TMG = tetramethylguanidine.
[4] TED = triethylenediamine (1, 4-diaza [2, 2, 2]-bicyclooctane).
[5] TMP = N, N'-1, 3, 4-trimethylpiperazine.
[6] In parts by weight.
[7] In minutes.
[8] In pounds per cubic foot.
[9] In pounds per square inch.
[10] Foams not suitable for further testing.

When a foamable polyurethane reaction mixture is poured into a mold, it first progresses to a creamy state and then begins to rise. The period between the time when the reaction mixture is poured into the mold and the time at which it reaches this creamy state is known as the cream time, while the period between the time at which the reaction mixture is in the creamy state and the time at which the foamed mixture has risen to its maximum height is known as the rise time. Tack-free time is the period between the time at which the foamed mixture has reached its maximum height and the time at which the foam's surface becomes tack-free.

Of the three periods, the latter two, i.e., rise time and tack-free time, are the most significant. It can be seen from Table II that in general the foams prepared using 1,1,2,4,4,5,5-heptamethylbiguanide as catalyst exhibited quite satisfactory rise times and tack-free times, and also that the ratios of their compressive strengths to their densities were, in all cases but one, superior to those of any of the other foams tested, in spite of the fact that in all cases the amount of this catalyst used was smaller than the amounts of any of the other catalysts.

Examples XVI–XXIII illustrate the preparation of "one-shot" rigid foams.

*Example XVI*

A mixture of 15 parts and 0.5 part, respectively, of the sorbitol polyether and silicone surfactant described in Example I above, 35 parts of a commercially available aromatic-based polyether having a hydroxyl number of 380, 12.2 parts of trichloromonofluoromethane and 0.25 part of 1,1,2,4,4,5,5-heptamethylbiguanide, contained in a suitable mixing vessel, was stirred by hand until it became substantially homogeneous. Next, 34.8 parts of toluenediisocyanate (mixed isomers—80% of the 2,4-isomer, 20% of the 2,6-isomer) were rapidly added to the homogeneous mixture. The resulting reaction mixture was stirred at room temperature for 12 seconds at 1700–1900 r.p.m. using a mechanical stirrer and then poured into a mold of the type described in Example I above and allowed to foam. Once the foam had reached its maximum height and its upper surface had become tack-free, it was removed from the mold and cured in a controlled humidity oven (50% relative humidity) for 24 hours at 73° F.

*Examples XVII–XIX*

Three foam samples were prepared in the manner described in Example XVI above, the sole variation in the procedure given therein being that 0.20, 0.15 and 0.10 part, respectively, of 1,1,2,4,4,5,5-heptamethylbiguanide were employed instead of 0.25 part. Various physical properties measured for each of the foams of Examples XVI–XIX are given in Table III below.

TABLE III

| Example | Catalyst | Catalyst Concentration [2] | Rise Time [3] | Tack-Free Time [3] | Foam Density [4] | Compressive Strength [5] | Compressive Strength/ Density |
|---|---|---|---|---|---|---|---|
| XVI | HpMBG [1] | 0.25 | 15 | 5 | 2.12 | 32.2 | 15.2 |
| XVII | HpMBG | 0.20 | 40 | 5 | 2.11 | 29.5 | 14.0 |
| XVIII | HpMBG | 0.15 | 50 | 5 | 2.09 | 29.8 | 14.3 |
| XIX | HpMBG | 0.10 | 120 | 10 | 2.08 | 26.4 | 12.7 |

[1] HpMBG = 1, 1, 2, 4, 4, 5, 5-heptamethylbiguanide.
[2] In parts by weight.
[3] In seconds.
[4] In pound per cubic foot.
[5] In pounds per square inch.

*Example XX*

A mixture of 50 parts and 0.5 part, respectively, of the sorbitol-based polyether and silicone surfactant described in Example I above, 12.5 parts of trichloromonofluoromethane and 0.08 part of 1,1,2,4,4,5,5-heptamethylbiguanide, contained in a suitable mixing vessel, was stirred by hand until it became substantially homogeneous. Next, 40 parts of toluenediisocyanate (mixed isomers, as in Example XVI) were rapidly poured into the homogeneous mixture, and the resulting reaction mixture was stirred at room temperature for 15 seconds at 1700–1900 r.p.m. using a mechanical stirrer. The stirred reaction mixture, grey in color, was then poured into a mold of the type described in Example I above and allowed to foam. Once the foam had reached its maximum height and its upper surface had become tack-free, it was removed from the mold and cured in a controlled humidity oven (50% relative humidity) for 24 hours at 73° F.

Examples XXI and XXII

Two foam samples were prepared in the manner described in Example XX above, the sole variation in the procedure given therein being that 0.3 and 0.4 part, respectively, of triethylenediamine were employed in place of 1,1,2,4,4,5,5-heptamethylbiguanide to catalyze the reactions.

Example XXIII

An additional foam sample was prepared as described in Example XX above, with the sole variations in the procedure given in said example being that 50 parts of a commercially available propylene oxide adduct of sorbitol having a molecular weight of 700 and a hydroxyl number of 485 and 0.5 part of triethylenediamine were employed in place of the polyol and catalyst recited therein. Various physical properties measured for each of the foams of Examples XX–XXIII are given in Table IV below.

TABLE IV

| Example | Catalyst | Catalyst Concentration [3] | Foam Density [4] | Compressive Strength [5] | Compressive Strength/ Density |
|---|---|---|---|---|---|
| XX | HpMBG [1] | 0.08 | 2.86 | 35.0 | 12.2 |
| XXI | TED [2] | 0.3 | 2.33 | 22.0 | 9.4 |
| XXII | TED | 0.4 | 2.09 | 26.0 | 12.4 |
| XXIII | TED | 0.5 | 2.13 | 22.0 | 10.3 |

[1] HpMBG=1,1,2,4,4,5,5-heptamethylbiguanide.
[2] TED=triethylenediamine.
[3] In parts by weight.
[4] In pounds per cubic foot.
[5] In pounds per square inch.

It will be obvious to those skilled in the art that other changes and variations may be made in carrying out the present invention without departing from the spirit and scope thereof as defined in the appended claims.

I claim:

1. A process for the preparation of polyurethane foams which comprises reacting an organic polyisocyanate with a reactive organic polyfunctional polyol containing a plurality of isocyanate-reactive hydroxyl groups in the presence of a gas-generating agent and a catalytic amount of 1,1,2,4,4,5,5-heptamethylbiguanide.

2. A process for the preparation of polyurethane foams which comprises reacting an organic polyisocyanate with a reactive organic polyfunctional polyol containing a plurality of isocyanate-reactive hydroxyl groups in the presence of water and a catalytic amount of 1,1,2,4,4,5,5-heptamethylbiguanide.

3. A process for the preparation of polyurethane foams which comprises reacting an organic polyisocyanate with a reactive organic polyfunctional polyol containing a plurality of isocyanate-reactive hydroxyl groups in the presence of a liquid halogenated saturated hydrocarbon having a boiling point such that it will vaporize under reaction conditions and a catalytic mount of 1,1,2,4,4,5,5-heptamethylbiguanide.

4. A process for the preparation of polyurethane foams which comprises reacting an organic polyisocyanate with a reactive organic polyfunctional polyol containing a plurality of isocyanate-reactive hydroxyl groups in the presence of trichloromonofluoromethane and a catalytic amount of 1,1,2,4,4,5,5-heptamethylbiguanide.

5. A process for the preparation of polyurethane foams which comprises reacting an aromatic diisocyanate with a polyalkylene ether glycol having a molecular weight of at least about 500 in the presence of water and a catalytic amount of 1,1,2,4,4,5,5-heptamethylbiguanide.

6. A process for the preparation of polyurethane foams which comprises reacting an aromatic diisocyanate with a polyalkylene ether glycol having a molecular weight of at least about 500 in the presence of a liquid halogenated saturated hydrocarbon having a boiling point such that it will vaporize under reaction conditions and a catalytic amount of 1,1,2,4,4,5,5-heptamethylbiguanide.

7. A process for the preparation of polyurethane foams which comprises reacting an aromatic diisocyanate with a polyalkylene ether glycol having a molecular weight of at least about 500 in the presence of trichloromonofluoromethane and a catatlytic amount of 1,1,2,4,4,5,5-heptamethylbiguanide.

8. A process for the preparation of polyurethane foams which comprises forming a pre-polymer by reacting, under substantially anhydrous conditions, a reactive organic polyfunctional polyol containing a plurality of isocyanate-reactive hydroxyl groups with a molar excess of an organic polyisocyanate and reacting the resulting pre-polymer with a reactive organic polyfunctional polyol containing a plurality of isocyanate-reactive hydroxyl groups in the presence of a gas-generating agent and a catalytic amount of 1,1,2,4,4,5,5-heptamethylbiguanide.

9. A process for the preparation of polyurethane foams which comprises forming a pre-polymer by reacting, under substantially anhydrous conditions, a reactive organic polyfunctional polyol containing a plurality of isocyanate-reactive hydroxyl groups with a molar excess of an organic polyisocyanate and reacting the resulting pre-polymer with a reactive organic polyfunctional polyol containing a plurality of isocyanate-reactive hydroxyl groups in the presence of a liquid halogenated saturated hydrocarbon having a boiling point such that it will vaporize under reaction conditions and a catalytic amount of 1,1,2,4,4,5,5-heptamethylbiguanide.

10. A process for the preparation of polyurethane foams which comprises forming a pre-polymer by reacting, under substantially anhydrous conditions, a reactive organic polyfunctional polyol containing a plurality of isocyanate-reactive hydroxyl groups with a molar excess of an organic polyisocyanate and reacting the resulting pre-polymer with a reactive organic polyfunctional polyol containing a plurality of isocyanate-reactive hydroxyl groups in the presence of trichloromonofluoromethane and a catalytic amount of 1,1,2,4,4,5,5-heptamethylbiguanide.

11. A process for the preparation of polyurethane foams which comprises forming a pre-polymer by reacting, under substantially anhydrous conditions, a polyalkylene ether glycol having a molecular weight of at least about 500 with a molar excess of an aromatic diisocyanate and reacting the resulting pre-polymer with a polyalkylene ether glycol having a molecular weight of at least about 500 in the presence of a liquid halogenated saturated hydrocarbon having a boiling point such that it will vaporize under reaction conditions and a catalytic amount of 1,1,2,4,4,5,5-heptamethylbiguanide.

12. A process for the preparation of polyurethane foams which comprises forming a pre-polymer by reacting, under substantially anhydrous conditions, a polyalkylene ether glycol having a molecular weight of at least about 500 with a molar excess of an aromatic diisocyanate and reacting the resulting pre-polymer with a polyalkylene ether glycol having a molecular weight of at least about 500 in the presence of trichloromonofluoromethane and a catalytic amount of 1,1,2,4,4,5,5-heptamethylbiguanide.

13. A process for the preparation of polyurethane foams which comprises reacting a toluene diisocyanate with a polyalkylene ether glycol having a molecular weight of at least about 500 in the presence of a gas-generating agent and a catalytic amount of 1,1,2,4,4,5,5-heptamethylbiguanide.

14. A process for the preparation of polyurethane foams which comprises reacting a toluene diisocyanate with a polyalkylene ether glycol having a molecular weight of at least about 500 in the presence of water and a catalytic amount of 1,1,2,4,4,5,5-heptamethylbiguanide.

15. A process for the preparation of polyurethane foams which comprises reacting a toluene diisocyanate with a polyalkylene ether glycol having a molecular weight of at least about 500 in the presence of a liquid halogenated saturated hydrocarbon having a boiling point such that it will vaporize under reaction conditions and a catalytic amount of 1,1,2,4,4,5,5-heptamethylbiguanide.

16. A process for the preparation of polyurethane foams which comprises reacting a toluene diisocyanate with a polyalkylene ether glycol having a molecular weight of at least about 500 in the presence of trichloromonofluoromethane and a catalytic amount of 1,1,2,4,4,5,5-heptamethylbiguanide.

17. A process for the preparation of polyurethane foams which comprises forming a pre-polymer by reacting, under substantially anhydrous conditions, a polyalkylene ether glycol having a molecular weight of at least about 500 with a molar excess of a toluene diisocyanate and reacting the resulting pre-polymer with a polyalkylene ether glycol having a molecular weight of at least about 500 in the presence of a gas-generating agent and a catalytic amount of 1,1,2,4,4,5,5-heptamethylbiguanide.

18. A process for the preparation of polyurethane foams which comprises forming a pre-polymer by reacting, under substantially anhydrous conditions, a polyalkylene ether glycol having a molecular weight of at least about 500 with a molar excess of a toluene diisocyanate and reacting the resulting pre-polymer with a polyalkylene ether glycol having a molecular weight of at least about 500 in the presence of water and a catalytic amount of 1,1,2,4,4,5,5-heptamethylbiguanide.

19. A process for the preparation of polyurethane foams which comprises forming a pre-polymer by reacting, under substantially anhydrous conditions, a polyalkylene ether glycol having a molecular weight of at least about 500 with a molar excess of a toluene diisocyanate and reacting the resulting pre-polymer with a polyalkylene ether glycol having a molecular weight of at least about 500 in the presence of a liquid halogenated saturated hydrocarbon having a boiling point such that it will vaporize under reaction conditions and a catalytic amount of 1,1,2,4,4,5,5-heptamethylbiguanide.

20. A process for the preparation of polyurethane foams which comprises forming a pre-polymer by reacting, under substantially anhydrous conditions, a polyalkylene ether glycol having a molecular weight of at least about 500 with a molar excess of a toluene diisocyanate and reacting the resulting pre-polymer with a polyalkylene ether glycol having a molecular weight of at least about 500 in the presence of trichloromonofluoromethane and a catalytic amount of 1,1,2,4,4,5,5-heptamethylbiguanide.

No references cited.

LEON J. BERCOVITZ, *Primary Examiner.*

WILLIAM SHORT, *Examiner.*

UNITED STATES PATENT OFFICE
CERTIFICATE OF CORRECTION

Patent No. 3,215,645　　　　　　　　　　November 2, 1965

Kenneth G. Flynn

It is hereby certified that error appears in the above numbered patent requiring correction and that the said Letters Patent should read as corrected below.

Column 2, line 23, for "therein," read -- therein. --; column 6, line 42, for "reactants" read -- reactant --; line 72, before "octa," insert -- hepta-, --; column 8, line 66, for "close" read -- closed --; column 9, lines 48 to 52, the formula should appear as shown below instead of as in the patent:

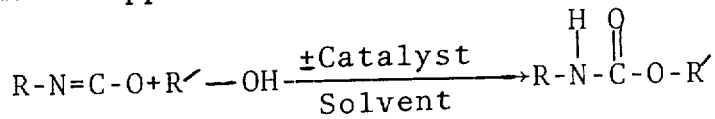

Signed and sealed this 16th day of August 1966.

(SEAL)
Attest:

ERNEST W. SWIDER　　　　　　　　　　　EDWARD J. BRENNER
Attesting Officer　　　　　　　　　　　Commissioner of Patents